UNITED STATES PATENT OFFICE 2,109,807

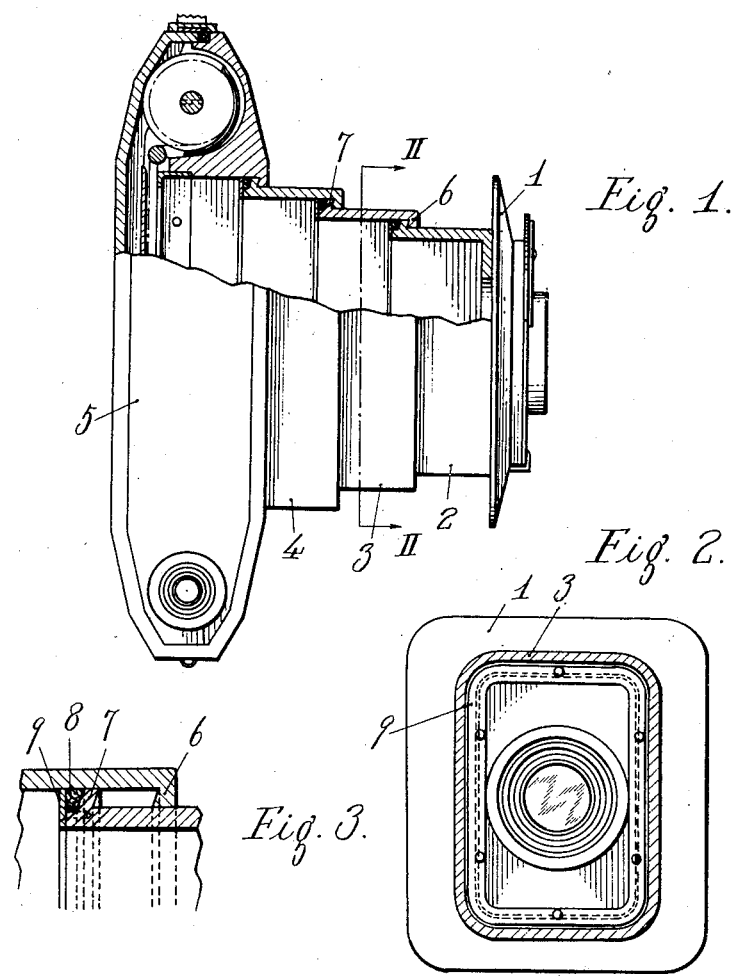

CAMERA WITH SOLID BELLOWS

Toyojiro Tajima, Mikage-cho, Hyogo-ken, Japan

Application October 6, 1936, Serial No. 104,328
In Japan July 11, 1936

1 Claim. (Cl. 95—39)

This invention relates to improvements in a camera with solid bellows, and particularly to the construction of the bellows.

The main object of this invention is to provide bellows made of two or more square frames slidably and telescopically fitted one by one, and the packings placed in the slidable contacting surface between adjacent frames to prevent rays from stealing into the camera can be easily replaced without requiring the use of special tools.

The drawing shows the detailed construction of this invention. Fig. 1 is a part sectional elevation of a camera according to this invention. Fig. 2 is a sectional view on the line II—II of Fig. 1. Fig. 3 is an enlarged sectional view of a contacting part between adjacent frames.

In the drawing, 1 is the front frame of a camera in which are provided with lenses and other devices, and a frame 2 of the bellows is fixed thereto. Frames 2, 3 and 4 are made of ebonite, resinous compound, non-transparent celluloid, light metal or the like, and have an oblong section, each corner being preferably made in a smooth curvature. Their dimensions are such that they telescopically fit one by one and can be closely slid with each other. Each frame has an inner flange 6 at the front end and an outer flange 7 at the other, and the outer flange of one frame closely fits to the inner surface of the next larger frame and the inner flange of the larger frame closely fits to the outer surface of the next smaller frame as clearly shown in the drawing. The outer flange of the largest frame 4 fits to the inner surface of the body 5 of the camera, and the depths of each frame and the body is such that when the bellows are folded, all the frames are placed in the body so that the back surface of the front frame just touches the front surface of the body.

The outer corner of the outer flange of each frame is cut off so as to make a recess 8 between the flange and the inner surface of the next frame. This recess serves to receive a packing material such as woolen yarn to shut off rays which may steal into the camera. 9 is a thin metallic cover plate detachably fixed to the surface of the outer flange, which serves to keep the packing material in the recess. This plate is fixed to the flange with set screws and faces to the back of the camera, therefore the plate can be easily removed from back side of the camera when the packing material in the recess becomes lean and rays may steal in. The bottom of the recess is sloped enlarging its width at the external surface of the flange, therefore the packing material in the recess presses the inner side of the frame by its expanding force when the cover plate is fixed to the surface of the flange.

According to this invention, the frames which form the bellows are oblong so that they do not rotate when the bellows are folded or unfolded. Since the cover plates of the packing recesses are detachable from the back side of the camera, the packing material can be replaced without taking up the bellows in pieces and requiring the use of any special tools.

What I claim is:—

Improvements in a camera comprising bellows made of square frames slidably and telescopically fitted one by one, each frame being provided with an inner flange at the front end and an outer flange at the other end so as to have the outer edge of the outer flange touch the inner surface of the next larger frame and the inner edge of the inner flange touch the outer surface of the next smaller frame, a recess provided along the outer surface of the outer flange of each frame for receiving a packing material therein, and a cover plate detachably fitted to the back surface of the outer flange forming the back side of the aforementioned recess so that the packing material can be replaced from the back side of the camera.

TOYOJIRO TAJIMA.